(12) United States Patent
Baert et al.

(10) Patent No.: US 11,053,696 B1
(45) Date of Patent: Jul. 6, 2021

(54) PANEL FOR FORMING A FLOOR COVERING AND SUCH FLOOR COVERING

(71) Applicant: Champion Link International Corporation, The Valley (AI)

(72) Inventors: Thomas Luc Martine Baert, Sint-Martens-Latem (BE); Tom Van Poyer, Jiaxing Zhejiang (CN); Sven Boon, Jiaxing Zhejiang (CN)

(73) Assignee: Champion Link International Corporation

(*) Notice: Subject to any disclaimer, the term of this patent is extended or adjusted under 35 U.S.C. 154(b) by 0 days.

(21) Appl. No.: 16/778,570

(22) Filed: Jan. 31, 2020

(51) Int. Cl.
| | | |
|---|---|---|
| *E04B 2/00* | (2006.01) | |
| *E04F 15/10* | (2006.01) | |
| *E04B 1/99* | (2006.01) | |
| *B32B 5/02* | (2006.01) | |
| *B32B 3/06* | (2006.01) | |
| *B32B 13/14* | (2006.01) | |

(52) U.S. Cl.
CPC .............. *E04F 15/107* (2013.01); *B32B 3/06* (2013.01); *B32B 5/02* (2013.01); *B32B 13/14* (2013.01); *E04B 1/99* (2013.01); *E04F 15/102* (2013.01); *B32B 2262/101* (2013.01); *B32B 2471/00* (2013.01)

(58) Field of Classification Search
CPC ..... E04F 15/02038; E04F 15/12; E04F 15/02; E04F 2201/023; F16B 5/0012; B29B 17/0042; B29B 17/00; B29B 17/02
USPC .......... 52/588.1, 592.1, 591.1, 415; 156/279, 156/307.4; 428/159, 171
See application file for complete search history.

(56) References Cited

U.S. PATENT DOCUMENTS

| | | | | |
|---|---|---|---|---|
| 3,931,428 A | * | 1/1976 | Reick | C08J 9/42 428/149 |
| 4,278,728 A | * | 7/1981 | Honda | B05D 7/546 442/226 |
| 5,336,551 A | * | 8/1994 | Graiver | C08J 5/04 428/137 |
| 5,631,053 A | * | 5/1997 | Andersen | B65D 43/162 428/36.4 |
| 5,776,580 A | * | 7/1998 | Rasmussen | E04B 1/80 428/74 |
| 6,688,061 B2 | | 2/2004 | Garcia | |
| 6,761,794 B2 | * | 7/2004 | Mott | B29B 17/0042 156/277 |

(Continued)

FOREIGN PATENT DOCUMENTS

| | | |
|---|---|---|
| CN | 100419019 | 2/2007 |
| CN | 101386516 | 3/2009 |

(Continued)

OTHER PUBLICATIONS

International Search Report and Written Opinion for corresponding PCT App. No. NL2024805 dated Sep. 23, 2020.

*Primary Examiner* — Chi Q Nguyen

(74) *Attorney, Agent, or Firm* — Emerson, Thomson & Bennett, LLC; Roger D. Emerson; Peter R. Detorre

(57) ABSTRACT

Provided is a panel suitable for forming a floor covering. The panel has a substantially planar top side, a substantially planar bottom side, and at least four substantially linear side edges. The linear side edges have at least one pair of opposite side edges. The linear side edges may be provided with a locking means.

19 Claims, 2 Drawing Sheets

(56) References Cited

U.S. PATENT DOCUMENTS

| | | | |
|---|---|---|---|
| 6,933,043 B1* | 8/2005 | Son | B32B 27/08 |
| | | | 428/215 |
| 7,255,907 B2 | 8/2007 | Feigin et al. | |
| 7,399,510 B2* | 7/2008 | Dupouy | B32B 15/04 |
| | | | 428/55 |
| 7,918,062 B2 | 4/2011 | Chen | |
| 8,287,991 B2* | 10/2012 | Donelson | B32B 27/36 |
| | | | 428/200 |
| 8,419,877 B2* | 4/2013 | Pervan | E04F 15/02 |
| | | | 156/219 |
| 10,328,680 B2 | 6/2019 | Pervan | |
| 10,828,881 B2 | 11/2020 | Bergelin | |
| 2005/0208258 A1* | 9/2005 | Hosokawa | G11B 11/10584 |
| | | | 428/64.4 |
| 2005/0286397 A1* | 12/2005 | Inagaki | B29B 17/0042 |
| | | | 369/272.1 |
| 2007/0033891 A1* | 2/2007 | Imbabi | B01D 39/00 |
| | | | 52/387 |
| 2008/0149137 A1* | 6/2008 | Steinbrenner | C08J 9/40 |
| | | | 134/8 |
| 2008/0318004 A1* | 12/2008 | Ruhe | D04H 1/54 |
| | | | 428/171 |
| 2009/0017320 A1* | 1/2009 | Donelson | B32B 37/185 |
| | | | 428/482 |
| 2009/0155612 A1* | 6/2009 | Pervan | E04F 15/02 |
| | | | 428/498 |
| 2009/0308001 A1* | 12/2009 | Wu | F24S 20/66 |
| | | | 52/173.3 |
| 2010/0115974 A1* | 5/2010 | Okaza | F25B 25/005 |
| | | | 62/115 |
| 2011/0067336 A1* | 3/2011 | McDonald | B32B 25/14 |
| | | | 52/506.01 |
| 2013/0295346 A1* | 11/2013 | Ferguson | B29C 63/48 |
| | | | 428/196 |
| 2014/0087156 A1* | 3/2014 | Sarkis | C09D 5/02 |
| | | | 428/212 |
| 2014/0134402 A1 | 5/2014 | Pallon | |
| 2014/0272302 A1* | 9/2014 | Ciuperca | E04F 13/02 |
| | | | 428/150 |
| 2015/0059621 A1 | 3/2015 | Hauber | |
| 2016/0288447 A1* | 10/2016 | Cordeiro | B32B 9/025 |
| 2017/0204616 A1 | 7/2017 | Scholz | |
| 2018/0147873 A1 | 5/2018 | De Mondt | |
| 2018/0258651 A1* | 9/2018 | Meersseman | B32B 27/30 |
| 2019/0308914 A1 | 10/2019 | Kong | |
| 2020/0039190 A1* | 2/2020 | Lenaerts | B32B 27/12 |

FOREIGN PATENT DOCUMENTS

| | | |
|---|---|---|
| CN | 101386516 A | 3/2009 |
| DE | 102012000468 | 7/2013 |
| DE | 102012000468 A1 | 7/2013 |
| EP | 2060389 | 5/2009 |
| WO | 2012061300 | 5/2012 |
| WO | 2012061300 A2 | 5/2012 |
| WO | 2020114645 | 6/2020 |
| WO | 2020114645 A1 | 6/2020 |

* cited by examiner

US 11,053,696 B1

PANEL FOR FORMING A FLOOR COVERING AND SUCH FLOOR COVERING

BACKGROUND

1. Technical Field

The invention relates to a panel, in particular a floor panel, suitable for forming a floor covering. The invention furthermore relates to such floor covering.

2. Description of the Related Art

The flooring industry commonly uses mostly traditional materials for manufacturing (laminated) floor tiles. Examples of these materials are: high density fiberboard (HDF), which can be merged together by a formaldehyde or phenol-based resin; heterogeneous or homogeneous polyvinyl chloride (PVC), which may possibly comprise any plasticizers, pieces of solid hardwood; layers of veneers glued together; and fired and glazed clay such as ceramic and porcelain tiles. The purpose of use of these materials depends mainly on their material properties such as impact resistance, rigidity, acoustic performance and/or appearance. However, an interest in the use of alternative materials has occurred over the last few years. An example thereof is the use of mineral materials, since mineral materials generally benefit a relatively high and dimensional stability and sufficient resistance to heat, and have a low impact on the environment compared to traditional material such as PVC or HDF. However, due to its development having been focused on its use as building material, in particular as a gypsum/drywall replacement, it is not as of yet particularly suitable for use as component of a floor panel. Among other characteristics, an improvement in the bending strength, impact resistance, indentation resistance, internal cohesion and surface adhesion of a panel made of such a mineral material is desirable to make it suitable for use as a component of a floor panel.

It is a goal of the invention to provide at least an alternative embodiment of a composite mineral panel, in particular a floor panel, having competitive material properties with respect to the state of the art.

DETAILED DESCRIPTION

Figure 1:
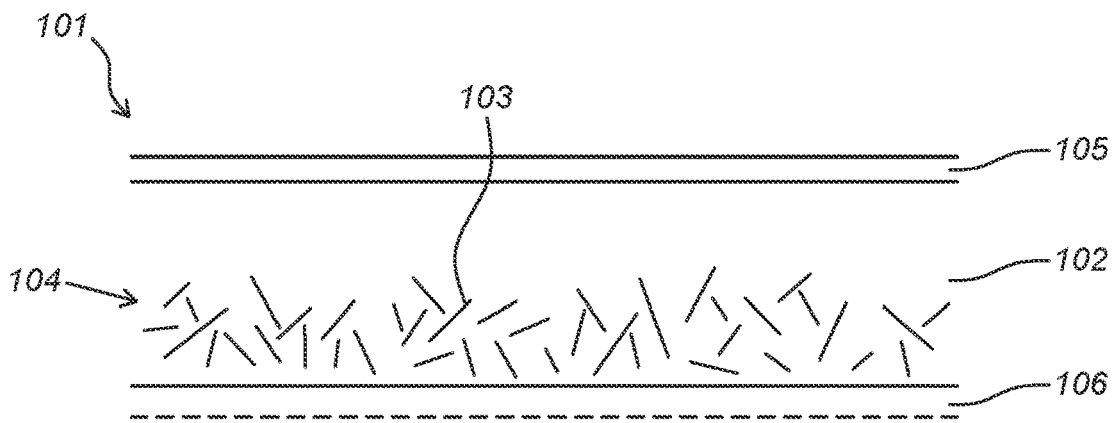
FIG. 1 is a schematic representation of a cross section of an embodiment of a panel.

The invention provides thereto a panel, in particular a floor panel, suitable for forming a floor covering, wherein the panel has a substantially planar top side, and a substantially planar bottom side, at least four substantially linear side edges comprising at least one pair of opposite side edges, the panel comprising at least one core layer at least partially comprising a magnesium crystal structure wherein said at least one core layer comprises at least one organic compound comprising at least two hydroxyl groups, preferably wherein said organic compound is present in the range of 0.05% to 5% by weight.

The core layer at least partially comprising a magnesium crystal structure which comprises at least one organic compound comprising at least two hydroxyl groups, preferably wherein said organic compound is present in the range of 0.05% to 5% by weight, results in the crystal structure having an increased amount of crystal in an advantageous whisker or needle form than in a flaky or irregular form.

The invention thus also relates to a panel, in particular a floor panel, suitable for forming a floor covering, wherein the panel has a substantially planar top side, and a substantially planar bottom side, at least four substantially linear side edges comprising at least one pair of opposite side edges, the panel comprising a core layer comprising a magnesium oxide cement, wherein the magnesium oxide cement comprises magnesium oxide crystals in a flaky or irregular and in a whisker or needle form, wherein there are more crystals in the whisker or needle form than in the flaky or irregular form.

The core layer comprising at least one core layer comprising a magnesium crystal structure, for example magnesium oxysulfate whiskers, which at least partially form a dense crystal microstructure, provides a notable improvement in internal cohesion in combination with a good impact resistance and good bending strength to the panel. This results in the panel being in particular suitable for flooring purposes. The magnesium crystal structure comprises magnesium crystals, preferably magnesium oxysulfate crystals.

In particular, the core layer comprises a magnesium oxide cement. The formation and microstructure of a magnesium oxide cement can be described in "crystal" or "hydration" phases and expressed in terms of a ternary system consisting of the ratio of magnesia, a magnesium salt such as magnesium sulfate or magnesium chloride, and water. Crystalline phases are formed upon curing into a ceramic compound and can be expressed in an abbreviated version referring to the molar ratio of each in the crystal formed. Magnesium oxysulfate cement, which uses the salt magnesium sulfate as a key binding material, can form two stable crystalline phases under ambient conditions; one of which is composed of the compounds magnesium oxide, magnesium sulfate and water, generally referred to as the 5-phase (also known as 5-1-3 phase, standing for $5Mg(OH)_2 \cdot MgSO_4 \cdot 3H_2O$), and 3-phase (also known as 3-1-8 phase, standing for $3Mg(OH)_2 \cdot MgSO_4 \cdot 8H_2O$). The former shows a beneficial needle- or whisker-like crystal structure of 0.2-1.0 µm diameter and a length of 20-50 µm that features good bending strength; whereas the latter shows a flaky or irregular crystal shape that results in a weaker composition. When it is referred to magnesium oxysulfate cement meant for use in livable conditions, a ceramic composition comprising either the crystal phase structure of magnesium oxysulfate whiskers of the 5-1-3 phase or the magnesium oxysulfate flakes of the 3-1-8 structure is meant. The 3-1-8 "flaky" structure is generally regarded to be the more stable phase structure under 20-60 C and livable atmospheric conditions. Other phases can form under extreme pressures and temperatures but are not stable under livable temperatures. When magnesium oxysulfate cement is prepared, naturally at least 50% of the composition consists of the 3-1-8 crystals. Its flaky or irregular structure results in an efflorescence of the panel surface, and subsequently an inferior cohesion and low surface adhesion which make it especially unsuitable for use as a component in a flooring panel.

The invention provides for a floor panel comprising at least one core layer comprising a ratio of the magnesium oxysulfate 5-1-3 "whisker" phase to 3-1-8 "flake" phase of more than 1.

The magnesium oxysulfate whiskers benefits of being formed under ambient conditions. The magnesium oxysulfate whiskers may also be referred to as needles. Due to the magnesium oxysulfate whiskers at least partially forming a crystal structure, the magnesium oxysulfate whiskers will interlock with another to form a high density microstructure. These interlocking whiskers thereby provide the improved strength to the core layer of the panel. Additionally, the panel according to the present invention benefits due to the presence of said core layer of a good impact resistance which is for example beneficial when applying multiple panels in a floor covering according to the invention. The compressive and indentation resistance of the crystal structure of the 5-1-3 phase is above 50 MPa when tested according to EN 310, whereas the 3-1-8 structure has a compressive and indentation resistance of only about 20 MPa. The panel according to the invention also benefits of a good water and moisture resistance as the whiskers are not easily soluble in water, whereas the 3-1-8 phase is less stable under wet conditions.

The magnesium oxysulfate whiskers are not an obvious material for a skilled person to use in the core material for the purpose of the present invention and in order to form a crystal structure. The skilled person would commonly use the more common magnesium (oxy)chloride cement which can also form a crystal phase, wherein the magnesium chloride whiskers can be present in a 5-1-8 ($5Mg(OH)_2 \cdot MgCl_2 \cdot 8H2O$) phase and/or 3-1-8 ($3Mg(OH)_2 \cdot MgCl_2 \cdot 8H2O$) phase. However, these magnesium chloride crystals are relatively intolerant to water, since water may leach out soluble magnesium chloride, which may result in a substantial loss of strength of the material. The magnesium oxysulfate whiskers do not experience this drawback. Instead of providing further additives to improve the material properties, the invention provides a different material. It is however not excluded that the floor panel according to the invention comprises a relatively small fraction of magnesium chloride, for example, up to at most 5% by weight, preferably less than 1%.

Magnesium oxysulfate whiskers can be produced via mixing of reactive magnesia with an aqueous magnesium sulfate solution. Said reactive magnesia can be obtained via a calcination process performed at temperatures in the range of 600 to 1300 degrees Celsius, and preferably in the range of 800 to 1000 degrees Celsius. Reactive magnesia (RM) can also be referred to as "caustic-calcined magnesia" (CCM) or light-burned magnesia.

A first condition for the formation of the desired MOS whiskers is the ratio of the raw materials. An aqueous magnesium salt solution is prepared by mixing $MgSO_4$ with water at a ratio of 0.6-2 to 1, stirring it for approximately 2 minutes to allow for it to dissolve, the such that the mixture will form a ceramic material during curing. To ensure a ratio of the whisker crystal phase to flake crystal phase of more than 1, a ratio of MgO vs $MgSO_4$ of around 4.6-5.8 to 1, more ideally 4.9-5.2 should be maintained. A second condition for the formation of the desired crystal structure is the addition of 0.05% to 10% by weight to the slurry of a second aqueous solution comprising 50% to 90% by weight of an organic compound comprising at least two hydroxyl (—OH) groups. This includes functional groups that comprise a hydroxyl group such as carboxyls (—COOH) that are noted to have the same effect on the formation of the MOS whisker crystals. Best results were achieved with dicarboxylic acids that contain two carboxyl functional groups —COOH, most favorably with a short chain length, such as oxalic acid $C2H2O4$ (two carboxyl —COOH groups) or mesoxalic acid $C3H2O5$ (two to four carboxyl —COOH groups based on presence of water). Good results were also achieved with citric acid $C6H8O7$ (four —OH hydroxyl groups), and boric acid $H3BO3$ (three —OH hydroxyl groups). It is found that the addition of at least a fraction of these elements influences the crystal structure of the core layer and increases and enhances the crystallization of the MgO into the preferred crystal phase that is advantageous for the foreseen use as a flooring panel. It is also conceivable that phosphoric acid is applied.

This mixture of ceramic material or ceramic cement and additives is poured onto a mold, and allowed to set at either ambient or elevated temperature until it has cured. The cured material benefits of a good strength and good fire-retardant properties, resulting in the material being in particular suitable for use in the building industry. It is, however, also possible that the magnesium oxysulfate whiskers are manufactured via water-heat synthesis from magnesium sulfate and magnesium hydroxide.

A panel according to the invention typically has a core layer having a thickness in the range of 3 to 10 millimeters. The density of said core layer is typically from 1200-1500 kg/m3, more specifically around 1300-1400 kg/m3. One embodiment of the invention can be composed of multiple layers of magnesium oxysulfate cement, each having a specific crystal structure, with beneficially at least a top layer comprising a ratio of 5-1-3 MOS whisker phase to 3-1-8 of more than 1, or a top and bottom layer of a similar ratio, or the substantially entire core consisting of such a similar ratio depending on the specific requirements of the floor panel in question. It is to be understood that in one embodiment, different layers of the core can have different crystal structure ratios for enhanced acoustical performance.

The panel has a substantially planar top side, and a substantially planar bottom side, at least four substantially linear side edges comprising at least one pair of opposite side edges. The panel is typically substantially rectangular or square. However it is also conceivable that the panel has a substantial parallelogram shape. When it is referred to panel, this can both a floor panel or a wall panel. The term tile is interchangeable with the term panel.

The length-to-diameter ratio of at least a number of magnesium oxysulfate whiskers is typically at least 5, preferably at least 10, more preferably at least 20. In this embodiment the magnesium oxysulfate whiskers can provide sufficient (bending) strength to the core layer of the panel. Possibly, at least a number of magnesium oxysulfate whiskers have an average diameter in the range of 0.2 to 1.0 micrometre and/or at least a number of magnesium oxysulfate whiskers have an average length in the range of 1 to 50 micrometres. The exact shape of the magnesium oxysulfate whiskers may differentiate, due to the phase wherein the magnesium oxysulfate whiskers are stable at the given temperature and humidity.

It is not required that the magnesium oxysulfate whiskers in the core layer form a crystal structure over the substantially entire core layer. In fact, in a preferred embodiment the core layer comprises at least 50% by weight of magnesium oxysulfate whiskers, preferably at least 55% by weight and more preferably at least 60% by weight of the whisker-phase crystal structure. The further volume of the core layer may have a non-crystal structure. The further volume of the core layer may for example be at least partially porous. In some embodiments, it is beneficial if the part of the core layer comprises a crystal structure of magnesium oxysulfate whiskers below 50% by weight.

A higher percentage may result in a reduced mechanical strength of the core layer, and therefore of the panel.

In a possible embodiment the core layer comprises an upper part and a lower part and a reinforcing layer situated between said upper part and said lower part of the core layer. The upper part of the core layer may even define the substantially planar top side, and the bottom part of the core layer may define the substantially planar bottom side of the panel. The presence of at least one reinforcing layer may lead to improvement of the acoustic properties of the panel. This may for example result in improved sound dampening properties. The presence of at least one reinforcing layer may also contribute to an improved strength of the panel as such. The reinforcement layer may for example comprise a woven or non-woven fibre material. The reinforcing layer may in a beneficial embodiment comprise fiberglass. The reinforcing layer may in particular comprise a fiberglass mesh. A non-limiting example thereof is a fiberglass mesh having a mesh size of at least 5×5 mm, and/or the fiberglass mesh having an area weight of at least 90 g/m2. In a possible embodiment may the fiberglass mesh be provided with a coating, in order to prevent skin-reactions during physical contact. It is conceivable that the reinforcing layer has a thickness of about 0.2 to 0.4 millimeters.

In a further possible embodiment, the core layer further comprises an intermediate part and a further reinforcing layer, wherein a first reinforcing layer is situated between said upper part and said intermediate part of the core layer, and a second reinforcing layer is situated between said intermediate part and said lower part of the core layer. The first and second reinforcing layer can both consist of a reinforcing layer as described above. The intermediate part of the core layer does not necessarily have the same material properties as the further parts of the core layer. It is for example conceivable that the intermediate part of the core layer is at least partially foamed. The intermediate part may therefore comprise a foaming agent. Such, at least partially foamed intermediate part of the core layer may further improve the acoustic performance of the panel.

In a preferred embodiment comprises the panel two pairs of opposite side edges which are provided with interconnecting coupling means. This will contribute to the ease of connect of multiple panels when assembling for example a floor covering. The interconnecting coupling means typically comprise a tongue and a groove wherein the tongue is provided on one side edge of one pair of opposite side edges, and the groove is provided on the other side edge of the same pair of opposite side edges. The interconnecting coupling means of co-acting panels may be provided with co-acting locking elements.

In a possible embodiment of the panel according to the invention the core layer further comprises at least one polymer and/or wood based material. It is also conceivable that the core layer further comprises at least one binder.

It is also possible that the panel further comprises at least one top layer. The top layer is typically provided on the top surface of the panel. It is beneficial if the top layer has suitable properties for its intended use such as a waterproof layer, wear layer, and/or decorative layer. Said top layer can be directly or indirectly attached to the core layer of the panel, for example via an adhesive, a hot melt material and/or hot or cold pressing. A decorative top layer, if applied, may for example comprise at least one ply of cellulose-based layer and a cured resin, wherein the cellulose-based layer is preferably paper or kraft paper. Said ply of cellulose-based material may also be a veneer layer adhered to a top surface of the core layer. The veneer layer is preferably selected from the group consisting of wood veneer, cork veneer, bamboo veneer, and the like. Other decorative top layers that could possibly be applied for the present invention include a ceramic tile, a porcelain tile, a real stone veneer, a rubber veneer, a decorative plastic or vinyl, linoleum, and decorative thermoplastic film or foil. The top layer may possibly be further provided with a wear layer and optionally a coating. Examples of thermoplastics which could be used in such top layer are PP, PET, PVC and the like. It is also possible to provide on the top facing surface of the core an optional primer and print the desired visual effect in a direct printing process. The decorative top layer can receive a further finishing with a thermosetting varnish or lacquer such as polyurethane, PUR, or a melamine based resin.

In a further possible embodiment comprises the panel at least one backing layer. This can be any suitable backing layer for use with (floor) panels. It is also conceivable that the panel comprises (at its back surface) at least one balancing layer, generally composed of at least one layer comprising lignocellulose and a cured resin. The panel may also comprise at least one acoustic layer, usually composed of a low density foamed layer of ethylene-vinyl acetate (EVA), irradiation-crosslinked polyethylene (IXPE), expanded polypropylene (XPP), expanded polystyrene (XPS), but also nonwoven fibers such as made from natural fibers like hemp or cork, or recycled/recyclable material such as PET. The density of this acoustic layer preferably has a density between 65 kg/m3 and 300 kg/m3, most preferably between 80 kg/m3 and 150 kgm3.

The invention also relates to a floor covering comprising multiple panels, in particular floor panels, according to any the preceding claims. However, a wall covering comprising multiple panels according to the invention also falls within the scope of the present invention.

Figure 2:
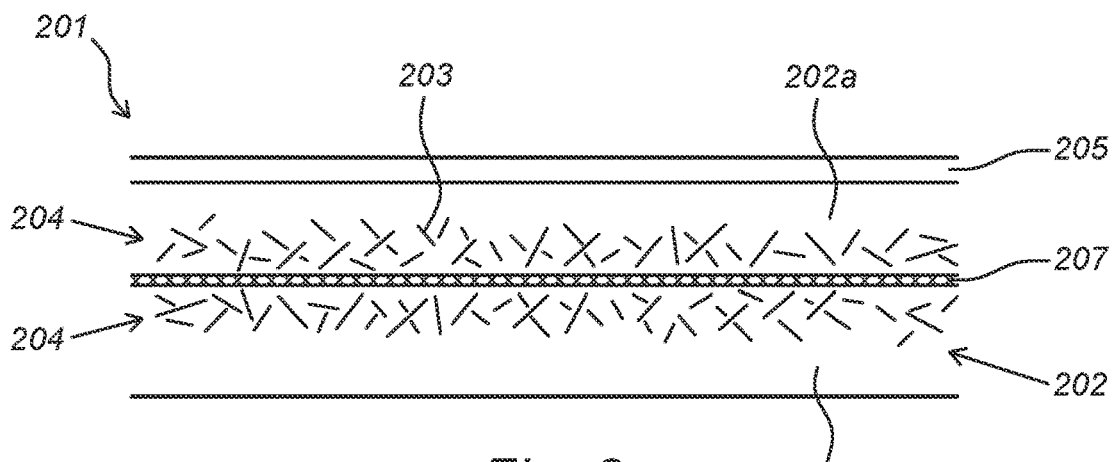
FIG. 2 is a schematic representation of a cross section of an embodiment of a panel.
Figure 3:
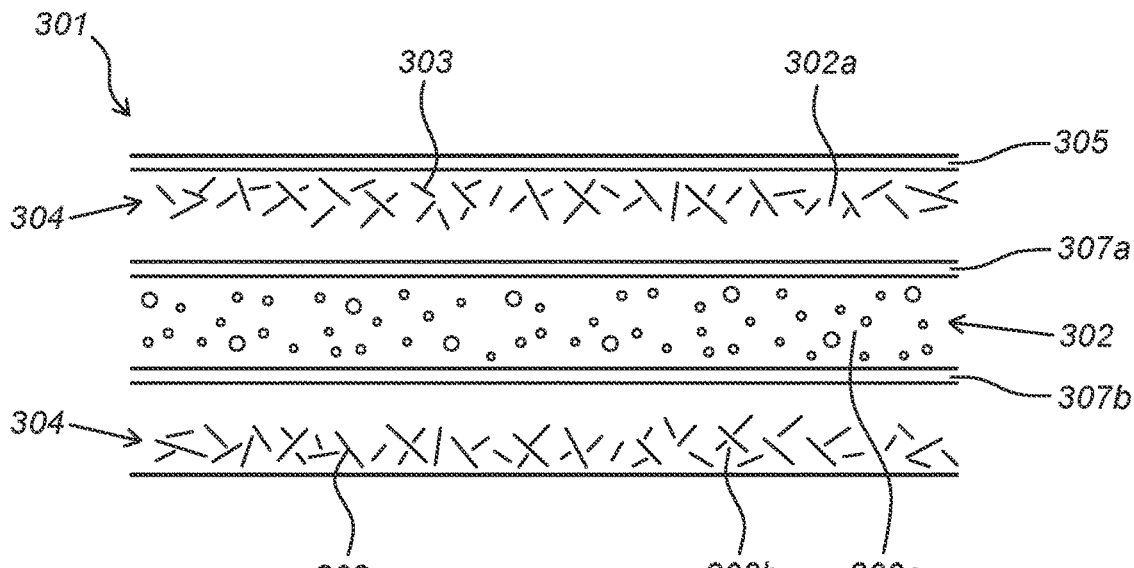
FIG. 3 is a schematic representation of a cross section of an embodiment of a panel.

The invention will be elucidated on the basis of non-limitative exemplary embodiments shown in the following figures. Herein shows:

FIG. 1 a first possible embodiment of panel according to the present invention,

FIG. 2 a second possible embodiment of a panel according to the present invention, and FIG. 3 a third possible embodiment of a panel according to the present invention.

FIG. 1 shows a schematic representation of a cross section of a first embodiment of a panel (101) according to the invention. The figure shows the panel (101) comprising a core layer (102) comprising magnesium oxysulfate whiskers (103) which at least partially form a crystal structure (104). It can be seen that the magnesium oxysulfate whiskers (103) interlock with another. The panel (101) further comprises a top layer (105) and optionally a backing layer (106).

FIG. 2 shows a schematic representation of a cross section of a second possible embodiment of a panel (201) according to the invention. The figure shows the panel comprising a core layer (202) comprising an upper part (202a) and a lower part (202b) and a reinforcing layer (207) situated between said upper part (202a) and said lower part (202b) of the core layer (202). Both parts (202a, 202b) of the core layer (102) comprise magnesium oxysulfate whiskers (203) which at least partially form a crystal structure (204). It can be seen that only a part of the total volume of the core layer (202)

comprises a crystal structure (204). The reinforcing layer (207) comprises a fiberglass mesh. The panel (201) further comprises a top layer (205).

FIG. 3 shows a schematic representation of a cross section of a third possible embodiment of a panel (301) according to the invention. The figure shows the panel comprising a core layer (302) wherein the core layer (302) comprises respectively an upper part (302a), a lower part (302b) and an intermediate part (302c). Said parts are separated via multiple reinforcing layers (307a, 307b). In the present embodiment is the intermediate part (302c) of the core layer (302) a foam layer. The other parts (302a, 302b) of the core layer (102) comprise magnesium oxysulfate whiskers (303) which at least partially form a crystal structure (304). The panel (301) further comprises a top layer (305).

Figure 4:
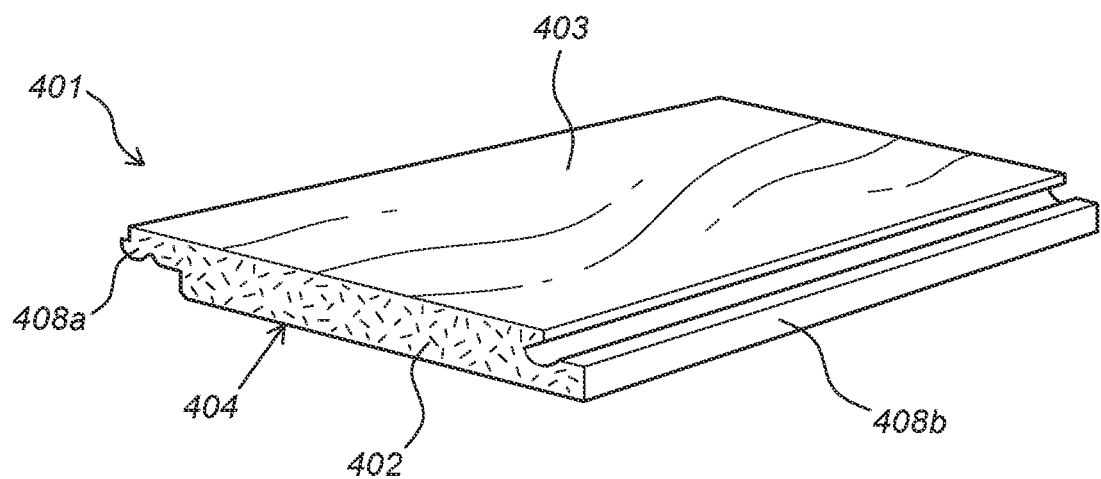
FIG. 4 is a perspective view of an exemplary panel.

FIG. 4 shows a perspective view of a possible embodiment of a flooring panel (401) according to the present invention. The panel (401) includes a core layer (402) and a decorative top layer (403). The core layer (402) includes two pairs of opposite side edges. In the shown embodiment, a first pair of opposite side edges is provided with interconnecting coupling parts (408a, 408b) for interconnecting adjacent panels (401). The shown interconnecting coupling parts (408a, 408b) are shown as an illustration, any type of conventional coupling parts could be applied. The core layer (402) includes a magnesium crystal structure (404) comprising magnesium crystal whiskers.

Figure 5:
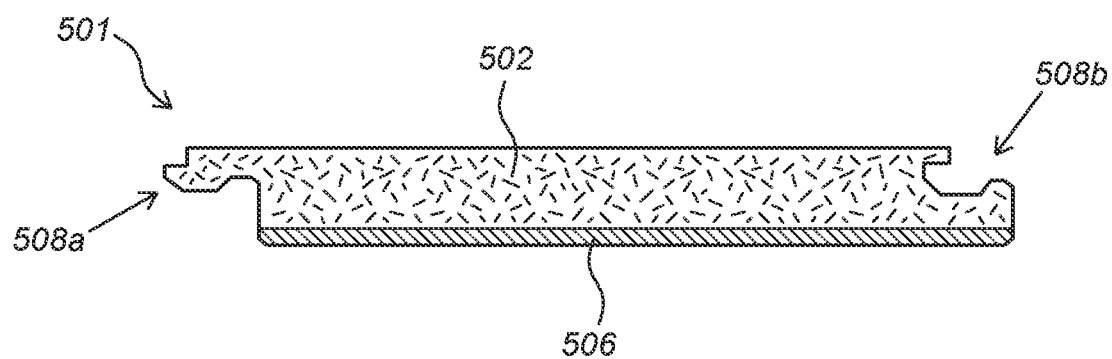
FIG. 5 is a side view of an exemplary panel.

FIG. 5 shows a cross section of a further possible embodiment of a flooring panel (501) according to the present invention. The panel (501) includes a core layer (501) and backing layer (506). The panel (501) further includes interconnecting coupling parts (508a, 508b) for interconnecting adjacent panels (501).

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

What is claimed is:

1. A floor panel comprising at least one core layer, a planar top side, and a planar bottom side, at least four linear side edges having at least one pair of opposite side edges, at least one core layer comprising a magnesium crystal structure having a whisker phase and a flake crystal phase, wherein a ratio of the whisker phase to the flake crystal phase is higher than 1, and wherein the core layer comprises at least one organic compound comprising at least two hydroxyl groups.

2. The panel according to claim 1, wherein the magnesium crystal structure is a magnesium oxysulfate crystal structure.

3. The panel according to claim 2, wherein at least a number of magnesium oxysulfate whiskers have an average diameter of 0.2 to 1.0 micrometre.

4. The panel according to claim 2, wherein at least a number of magnesium oxysulfate whiskers have an average length of 1 to 50 micrometres.

5. The panel according to claim 2, wherein the core layer comprises at least 55% by weight of magnesium oxysulfate whiskers.

6. The panel according to claim 2, wherein the core layer comprises at least 60% by weight of magnesium oxysulfate whiskers.

7. The panel according to claim 1, wherein said organic compound comprising at least two hydroxyl (—OH) groups is an acid selected from the group consisting of oxalic acid, citric acid, phosphoric acid and boric acid.

8. The panel according to claim 1, wherein the core layer comprises an upper part and a lower part and a reinforcing layer situated between said upper part and said lower part of the core layer.

9. The panel according to claim 8, wherein the reinforcing layer comprises fiberglass.

10. The panel according to claim 9, wherein the upper reinforcing layer comprises a fiberglass mesh.

11. The panel according to claim 10, wherein the core layer comprises an intermediate part and a further reinforcing layer, wherein a first reinforcing layer is situated between said upper part and said intermediate part of the core layer, and a second reinforcing layer is situated between said intermediate part and said lower part of the core layer.

12. The panel according to claim 11, comprising two pairs of opposite side edges which are provided with interconnecting coupling means.

13. The panel according to claim 12, wherein the interconnecting coupling means comprise a tongue and a groove, wherein the tongue is provided on one side edge of one pair of opposite side edges and the groove is provided on an opposing side edge of a same pair of opposite side edges.

14. The panel according to claim 1, wherein the core layer further comprises at least one binder.

15. The panel according to claim 1, comprising at least one top layer, wherein the top layer comprises at least one of a decorative layer and a protective layer.

16. The panel according to claim 1, comprising at least one backing layer for improved balance and acoustical performance.

17. A floor covering comprising multiple floor panels according to claim 1.

18. The panel according to claim 1, wherein the magnesium crystal structure is a magnesium oxychloride crystal structure.

19. The panel according to claim 1, wherein the core layer comprises 0.05% to 5% by weight of at least one organic compound comprising at least two hydroxyl groups.

* * * * *